United States Patent
Zeng et al.

(10) Patent No.: US 9,684,482 B2
(45) Date of Patent: Jun. 20, 2017

(54) MULTI-MONITOR DISPLAY SYSTEM

(75) Inventors: Henry Zeng, Sunnyvale, CA (US); Jimmy Lee, Palo Alto, CA (US)

(73) Assignee: Synaptics Incorporated, San Jose, CA (US)

( * ) Notice: Subject to any disclaimer, the term of this patent is extended or adjusted under 35 U.S.C. 154(b) by 899 days.

(21) Appl. No.: 12/634,571

(22) Filed: Dec. 9, 2009

(65) Prior Publication Data

US 2010/0177017 A1 Jul. 15, 2010

Related U.S. Application Data

(63) Continuation-in-part of application No. 12/353,132, filed on Jan. 13, 2009.

(51) Int. Cl.
*G09G 5/00* (2006.01)
*G06F 3/14* (2006.01)

(52) U.S. Cl.
CPC .......... *G06F 3/1431* (2013.01); *G06F 3/1446* (2013.01); *G09G 5/006* (2013.01); *G09G 2370/10* (2013.01); *G09G 2380/14* (2013.01)

(58) Field of Classification Search
CPC ....... G06F 3/1431; G06F 3/1446; G09G 5/00; G09G 5/006; G09G 3/2096; G09G 1/167; H04N 7/08
USPC ........................................... 345/1.1, 1.2, 1.3
See application file for complete search history.

(56) References Cited

U.S. PATENT DOCUMENTS

| | | | |
|---|---|---|---|
| 6,501,441 B1 | 12/2002 | Ludtke et al. | |
| 6,747,655 B2* | 6/2004 | Ono et al. | 345/502 |
| 7,250,978 B2* | 7/2007 | Lee et al. | 348/383 |
| 7,548,415 B2* | 6/2009 | Kim | 361/679.27 |
| 8,031,200 B2* | 10/2011 | Goodart | G06F 3/1438 345/1.1 |
| 8,248,425 B2* | 8/2012 | Ghosh | 345/536 |
| 2004/0150581 A1 | 8/2004 | Westerinen et al. | |
| 2006/0158560 A1 | 7/2006 | Jung | |
| 2006/0170689 A1* | 8/2006 | Maier | B60K 35/00 345/501 |
| 2006/0179201 A1* | 8/2006 | Riedel | G09G 5/006 710/305 |
| 2007/0213093 A1* | 9/2007 | Kim | H04M 1/0233 455/556.1 |
| 2008/0055189 A1 | 3/2008 | Wilk et al. | |

(Continued)

FOREIGN PATENT DOCUMENTS

| | | |
|---|---|---|
| JP | 2002-244634 A | 8/2002 |
| TW | 200413943 A | 8/2004 |

OTHER PUBLICATIONS

PCT International Search Report and the Written Opinion mailed Mar. 2, 2010, in related International Application No. PCT/US2010/020798.

(Continued)

*Primary Examiner* — Jennifer Mehmood
*Assistant Examiner* — Sardis F Azongha
(74) *Attorney, Agent, or Firm* — Osha Liang LLP

(57) ABSTRACT

A multi-monitor display is disclosed. A multi-monitor display receives video data configured for a single NxM video display; splits the video data into a plurality of portions spanning the NxM display; and transmits the plurality of portions to a corresponding plurality of displays. The multi-monitor display system can be any system, for example a display-port system or an ePaper system.

21 Claims, 12 Drawing Sheets

(56) References Cited

U.S. PATENT DOCUMENTS

| | | |
|---|---|---|
| 2008/0084359 A1 | 4/2008 | Giannuzzi et al. |
| 2008/0201215 A1* | 8/2008 | Lin .................................. 705/14 |
| 2008/0205519 A1 | 8/2008 | Goodart et al. |
| 2009/0141011 A1* | 6/2009 | Greb .................... G09G 3/3611 |
| | | 345/206 |
| 2009/0231232 A1 | 9/2009 | Chan |
| 2009/0322767 A1 | 12/2009 | Douglas et al. |

OTHER PUBLICATIONS

VESA DisplayPort Standard, Version 1, Revision 1a, Jan. 11, 2008.
Non-Final Office Action dated Mar. 6, 2012, in related U.S. Appl. No. 12/353,132.
Final Office Action dated Jun. 20, 2012, in related U.S. Appl. No. 12/353,132.
Office Action in Chinese Patent Application No. 201080011019.6 dated Jun. 6, 2013, along with English translation (8 pages).
Office Action in Japanese Patent Application No. 2011-546303 dated Dec. 3, 2013, along with English translation (6 pages).
Office Action in Taiwan Patent Application No. 99100666 dated Nov. 10, 2014, along with English translation (13 pages).

\* cited by examiner

| Lane 0 | Lane 1 | Lane 2 | Lane 3 |
|---|---|---|---|
| ... | ... | ... | ... |
| BE | BE | BE | BE |
| PIX0 | PIX1 | PIX2 | PIX3 |
| PIX4 | ... | ... | ... |
| ... | ... | ... | ... |
| ... | ... | ... | ... |
| PIXN | | | |
| BS | BS | BS | BS |
| VB-ID | VB-ID | VB-ID | VB-ID |
| MVID | MVID | MVID | MVID |
| MAUD | MAUD | MAUD | MAUD |
| audio | audio | audio | audio |
| audio | ... | ... | ... |
| ... | ... | ... | ... |
| ... | ... | ... | ... |
| BE | BE | BE | BE |
| PIX0 | PIX1 | PIX2 | PIX3 |
| ... | ... | ... | ... |

Figure 2A

| Lane 0 | Lane 1 | Lane 2 | Lane 3 | |
|---|---|---|---|---|
| BE | BE | BE | BE | |
| R0-9:2 | R1-9:2 | R2-9:2 | R3-9:2 | ←—Start |
| R0-1:0 \| G0-9:4 | R1-1:0 \| G1-9:4 | R2-1:0 \| G2-9:4 | R3-1:0 \| G3-9:4 | of |
| G0-3:0 \| B0-9:6 | G1-3:0 \| B1-9:6 | G2-3:0 \| B2-9:6 | G3-3:0 \| B3-9:6 | Active |
| B0-5:0 \| R4-9:8 | B1-5:0 \| R5-9:8 | B2-5:0 \| R6-9:8 | B3-5:0 \| R7-9:8 | Pixel |
| R4-7:0 | R5-7:0 | R6-7:0 | R7-7:0 | |
| G4-9:2 | G5-9:2 | G6-9:2 | G7-9:2 | |
| G4-1:0 \| B4-9:4 | G5-1:0 \| B5-9:4 | G6-1:0 \| B6-9:4 | G7-1:0 \| B7-9:4 | |
| B4-3:0 \| R8-9:6 | B5-3:0 \| R9-9:6 | B6-3:0 \| R10-9:6 | B7-3:0 \| R11-9:6 | |
| R8-5:0 \| G8-9:8 | R9-5:0 \| G9-9:8 | R10-5:0 \| G10-9:8 | R11-5:0 \| G11-9:8 | |
| G8-7:0 | G9-7:0 | G10-7:0 | G11-7:0 | |
| B8-9:2 | B9-9:2 | B10-9:2 | B11-9:2 | |
| B8-1:0 \| R12-9:4 | B9-1:0 \| R13-9:4 | B10-1:0 \| R14-9:4 | B11-1:0 \| R15-9:4 | |
| R12-3:0 \| G12-9:6 | R13-3:0 \| G13-9:6 | R14-3:0 \| G14-9:6 | R15-3:0 \| G15-9:6 | |
| G12-5:0 \| B12-9:8 | G13-5:0 \| B13-9:8 | G14-5:0 \| B14-9:8 | G15-5:0 \| B15-9:8 | |
| B12-7:0 | B13-7:0 | B14-7:0 | B15-7:0 | |

| Lane 0 | Lane 1 | Lane 2 | Lane 3 | |
|---|---|---|---|---|
| R1360-9:2 | R1361-9:2 | R1362-9:2 | R1363-9:2 | |
| R1360-1:0 \| G1360-9:4 | R1361-1:0 \| G1361-9:4 | R1362-1:0 \| G1362-9:4 | R1363-1:0 \| G1363-9:4 | |
| G1360-3:0 \| B1360-9:6 | G1361-3:0 \| B1361-9:6 | G1362-3:0 \| B1362-9:6 | G1363-3:0 \| B1363-9:6 | |
| B1360-5:0 \| R1364-9:8 | B1361-5:0 \| R1365-9:8 | B1362-5:0 \| --- | B1363-5:0 \| --- | |
| R1364-7:0 | R1365-7:0 | --- | --- | |
| G1364-9:2 | G1365-9:2 | --- | --- | |
| G1364-1:0 \| B1364-9:4 | G1365-1:0 \| B1365-9:4 | --- | --- | |
| B1364-3:0 \| --- | B1365-3:0 \| --- | --- | --- | ←— End |
| BS | BS | BS | BS | of |
| VB-ID | VB-ID | VB-ID | VB-ID | Active |
| Mvid7:0 | Mvid7:0 | Mvid7:0 | Mvid7:0 | Pixel |
| Maud7.0 | Maud7.0 | Maud7.0 | Maud7.0 | |

Figure 2B

MULTI-MONITOR DISPLAY SYSTEM

RELATED CASES

The present application claims priority to and is a continuation-in-part of U.S. patent application Ser. No. 12/353,132, filed on Jan. 13, 2009, which is herein incorporated by reference in its entirety.

BACKGROUND

1. Technical Field

The present invention is related to a multi-monitor drive and, in particular, a multi-monitor drive without a separate driver for each monitor.

2. Discussion of Related Art

It is becoming more common to utilize multiple monitors. According to a survey by Jon Peddie Research cited in The New York Times, Apr. 20, 2006, it is estimated that use of multiple monitors can increase worker efficiency between 20 to 30 percent. Utilization of multiple monitors can also greatly enhance entertainment such as video gaming or movies.

However, obtaining multiple monitors typically requires multiple video graphics drivers, one for each monitor. Desktop computers, for example, may have multiple graphics cards or a graphics card with multiple drivers on the card. Notebook computers may include a PCMIA cardbus card or such to drive multiple monitors. Further, USB ports may be utilized to drive additional monitors.

However, these options are expensive to implement, require hardware upgrades for addition of each extra monitor, and usually consume large amounts of power. USB ports may also not have enough bandwidth, especially if other devices are also utilizing the port, to provide good resolution to the monitors.

Therefore, there is a need for systems that allow use of multiple monitors.

SUMMARY

Consistent with embodiments of the present invention, a multi-monitor system may include a video receiver, the video receiver receiving video data appropriate for a video display of size N×M; a plurality of video transmitters, each of the plurality of video transmitters providing video data to display a portion of the video data on each of a corresponding plurality of video displays; and a splitter coupled between the video receiver and the plurality of video transmitters, the video receiver splitting the video data from the video receiver and providing portions of the video data to each of the plurality of video transmitters.

A method of providing a multi-monitor display consistent with the present invention includes receiving video data configured for a single N×M video display; splitting the video data into a plurality of portions spanning the video data; and transmitting the plurality of portions to a corresponding plurality of displays.

Both receiving and transmitting data may be performed according to the DisplayPort standard. These and other embodiments will be described in further detail below with respect to the following figures.

BRIEF DESCRIPTION OF THE DRAWINGS

FIGS. 2A and 2B illustrate packing of pixel data according to the DisplayPort standard.

Figure 1:
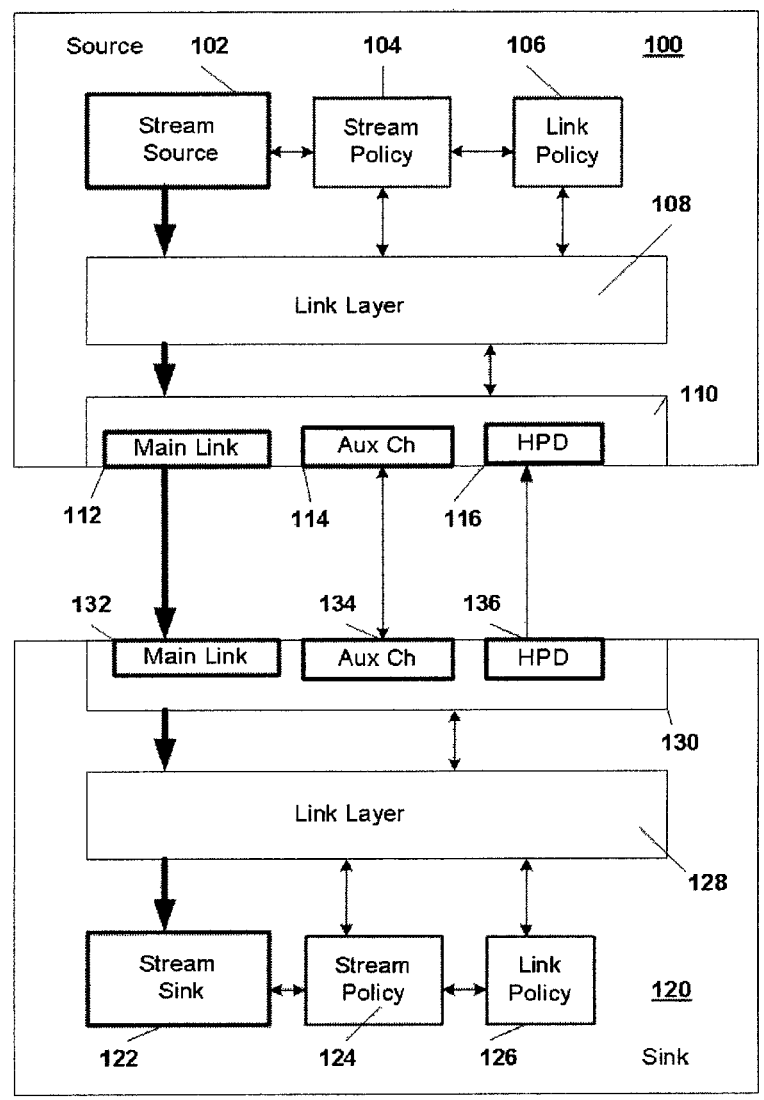
FIG. 1 illustrates aspects of a DisplayPort standard.

In the drawings, elements having the same designation have the same or similar functions.

DETAILED DESCRIPTION

In the following description specific details are set forth describing certain embodiments of the invention. It will be apparent, however, to one skilled in the art that the present invention may be practiced without some or all of these specific details. The specific embodiments presented are meant to be illustrative of the present invention, but not limiting. One skilled in the art may realize other material that, although not specifically described herein, is within the scope and spirit of this disclosure.

For illustrative purposes only, embodiments of the invention applicable to the VESA DisplayPort Standard are described below. The VESA DisplayPort Standard, Version 1, Revision 1a, released Jan. 11, 2008, which is available from the Video Electronics Standard Association (VESA), 860 Hillview Court, Suite 150, Milpitas, Calif. 95035, is herein incorporated by reference in its entirety. One skilled in the art will recognize that embodiments of the present invention can be utilized with other video display standards.

The DisplayPort (DP) standard is illustrated in FIG. 1. FIG. 1 shows a video source 100 in communication with a video sink 120. Source 100 is a source of video data. Sink 120 receives the video data for display. Data is transmitted between source 100 and sink 120 through three data links: a main link, an auxiliary channel, and a hot plug detect (HPD). Source 100 transmits the main link data between main link 112 of source 100 and main link 132 of sink 120, which are high bandwidth forward transmission links. Auxiliary channel data is transmitted between auxiliary channel 114 of source 100 and auxiliary channel 134 of sink 120, which are bi-direction auxiliary channels. HDP data is transmitted between HDP 116 of source 100 and HDP 136 of sink 136.

The DP standard currently provides for up to 10.8 Gbps (giga bits per second) through main link 112, which may support greater than QXGA (2048×1536) pixel formats, and greater than 24 bit color depths. Further, the DP standard currently provides for variable color depth transmissions of 6, 8, 10, 12, or 16 bits per component. In accordance with the DP standard, bi-directional auxiliary channel 114 provides for up to 1 Mbps (mega bit per second) with a maximum latency of 500 micro-seconds. Furthermore, a hot-plug detection channel 116 is provided. The DP standard provides for a minimum transmission of 1080p lines at 24 bpp at 50/60 Hz over 4 lanes at 15 meters.

Additionally, the DP standard supports reading of the extended display identification data (EDID) whenever sink 120 (which typically includes a display, but may also be a repeater or a duplicator) is connected to power. Further, the DP standard supports display data channel/command interface (DDC/CI) and monitor command and controls set (MMCS) command transmission. Further, the DP standard supports configurations that do not include scaling, a discrete display controller, or on screen display (OSD) functions.

The DP standard supports various audio and visual content standards. For example, the DP standard supports the feature sets defined in CEA-861-C for transmission of high quality uncompressed audio-video content, and CEA-931-B for the transport of remote control commands between sink 120 and source 100. Although support of audio aspects is not important to embodiments of the present invention, the DP standard supports up to eight channels of linear pulse code modulation (LPCM) audio at 192 kHz with a 24 bit sample size. The DP standard also supports variable video formats based on flexible aspect, pixel format, and refresh rate combinations based on the VESA DMT and CVT timing standards and those timing modes listed in the CEA-861-C standard. Further, the DP standard supports industry standard colorimetry specifications for consumer electronics devices, including RGB and YCbCr 4:2:2 and YCbCr 4:4:4.

As shown in FIG. 1, data is provided by stream source 102 to a link layer 108. Link layer 108 is coupled to provide data to physical layer 110. The data provided by stream source 102 can include video data. Link layer 108 packs the video data into one or more lanes and transmits the data to physical layer 110. Main link 112, auxiliary channel 114, and HPD 116 are included in the physical layer, which provides the signaling to transmit data to sink 120.

Sink 120 also includes a physical layer 130, which includes main link 132, auxiliary channel 134, and HPD 136, a link layer 128, and a stream sink 122. Stream sink 122 can, for example, by a video display and the data provides line and frame format associated with displaying video. Physical layer 130 receives the signals from physical layer 110, typically over a cable, and recovers data that had been transmitted by source 100. Link layer 128 receives the recovered data from physical layer 130 and provides video data to stream sink 122. Stream policy 104 and link policy 106 provide operating parameters to link layer 108. Similarly, stream policy 124 and link policy 126 provide policy data to link layer 128.

As discussed above, source 100 includes a physical layer 110 that includes main link 112, auxiliary channel 114, and HPD 116. Correspondingly, sink 120 includes a physical layer 130 with a main link 132, an auxiliary channel 134, and HDP 136. A cable and appropriate connectors are utilized to electronically couple main link 112 with main link 132, auxiliary channel 114 with auxiliary channel 134, and HDP 116 with HDP 136. In accordance with the DP standard, main link 112 transmits one, two, or four lanes that support 2.7 Gbps and 1.62 Gbps per lane, which is determined by the quality of the connection between main link 112 and main link 132. Physically, each lane can be an ac-coupled, doubly terminated differential pair of wires.

The number of lanes between main link 112 and main link 132 is one, two, or four lanes. The number of lanes is decoupled from the pixel bit depth (bpp) and component bit depth (bpc). Component bit depths of 6, 8, 10, 12, and 16 bits can be utilized. All of the lanes carry data and therefore the clock signal is extracted from the data stream. The data stream is encoded with the ANSI 8B/10B coding rule (ANSI X3.230-1994, clause 11).

FIG. 2A illustrates the data format packed into four lanes. Other lane configurations are similarly packed. As shown in FIG. 2A, the beginning of transmission of video data for a line of display begins with a blanking enable (BE) signal in each of the four lanes. Pixels are then packed into the lanes. As shown in FIG. 2A, in the four-lane example pixel 0 (PIX0) is in lane 0, pixel 1 (PIX1) is in lane 1, pixel 2 (PIX2) is in lane 2, and pixel 3 (PIX3) is in lane 3. The pixels are similarly packed across each of the lanes until the last pixel of the line is inserted, PIXN in an N×M sized display. As shown in FIG. 2A, the last pixel in the line is often such that not all slots in all the lanes are filled. In the example shown in FIG. 2A, lanes 1, 2, and 3 are not filled. Unused slots can be padded. The next row of slots in lanes 0 through 4 contains a blanking symbol (BS), followed with a video blanking ID (VB-ID), a video time stamp (MVID), and an audio time stamp (MAUD). Audio data follows the video data until the next BE symbol is sent. The next line of video data is then provided.

FIG. 2B illustrates an example encoding of 30 bpp RGB (10 bpc) 1366×768 video data into a four lane, 8-bit, link. One row of data is transmitted per clock cycle. In the figure, R0-9:2 means the red bits 9:2 of pixel 0. G indicates green, and B indicates blue. BS indicates a blanking start and BE indicates a blanking enable. Mvid 7:0 and Maud 7:0 are portions of the time stamps for video and audio stream clocks. As is indicated in FIG. 2B, the encoding into four lanes occurs sequentially by pixel, with pixel 0 of the line being placed in lane 0, pixel 1 in line 1, pixel 2 in line 2, and pixel 3 in lane 3. Pixels 4, 5, 6, and 7 are then placed in lanes 0, 1, 2, and 3. The same packing scheme is utilized regardless of the number of lanes used by source 100. Source 100 and sink 120 may support any of 1, 2, or 4 lanes under the DP standard. Those that support 2 lanes also support single lanes and those that support 4 lanes support both 2 lane and 1 lane implementations Auxiliary channel 114, which is coupled by cable with auxiliary channel 134 in sink 120, according to the DP standard includes an ac-coupled, doubly terminated differential pair. The clock can then be extracted from the data stream passing between auxiliary channel 114 and auxiliary channel 134. The auxiliary channel is half-duplex, bi-directional with source 100 being the master and sink 120 being the slave. Sink 120 can provide an interrupt by toggling the HDP signal coupled between HDP 116 and HDP 136.

Physical layer 110, which includes output pins and connectors for main link 112, auxiliary channel 114, and HDP 116, includes the physical transmit and receive circuits for passing signals between source 100 and sink 120. Similarly, physical layer 130, including main link 132, auxiliary channel 134, and HDP 136, includes the transmit and receive circuits for receive data and communicating with source 100.

Link layer 108 of source 100 maps the audio and visual data streams into the lanes of main link 112 as indicated in FIGS. 2A and 2B so that data can be retrieved by link layer 128 of sink 120. Further, link layer 108 interprets and handles communications and device management over auxiliary channel 114 and monitors HPD 116. Link layer 108 of source 100 corresponds with link layer 128 of sink 120. Among the tasks fulfilled in link layer 108 and link layer 128 is the determination of the number of lanes available and the data rate per lane. An initialization sequence is utilized to determine these parameters once link layer 108 detects a hot plug through HPD 116. Further, link layer 108 is responsible for mapping data into main link 112 for transport to main link 132. Mapping includes packing or unpacking, stuffing or unstuffing, framing or unframing, and inter-lane skewing or unskewing in link layer 108 and link layer 128, respectively. Link layer 108 reads the capability of sink device 120, the EDID, the link capability, and the DPCD, in order to determine the number of lanes and the pixel size of the display device associated with sink 120. Link layer 128 is also responsible for clock recovery from both auxiliary channel 114 and main link 112.

Further, link layer 108 is responsible for providing control symbols. As shown in FIG. 2A, a blanking start (BS) symbol is inserted after the last active pixel. The BS symbol is inserted in each active lane directly after the last pixel is inserted. Directly following the BS symbol, a video blanking ID (VB-ID) word is inserted. The VB-ID word can include a vertical blanking flag, which is set to 1 at the end of the last active line and remains one throughout the vertical blanking period, a Field ID flag, which is set to 0 right after the last active line in the top field and 1 right after the last active line of the bottom field, an interlace flag, which indicates whether the video stream is interlaced or not, a no video stream flag, which indicates whether or not video is being transmitted, and an audio-mute flag, which indicates when audio is being muted. MVID and MAUD provide timing synchronization between audio and video data.

Although the DP standard is specific with regard to data transmission, some of which is described above, embodiments consistent with the present invention may be utilized with other specifications. The DP standard has been described here in some specificity only as a framework in which some embodiments consistent with the present invention can be described.

Figure 3:
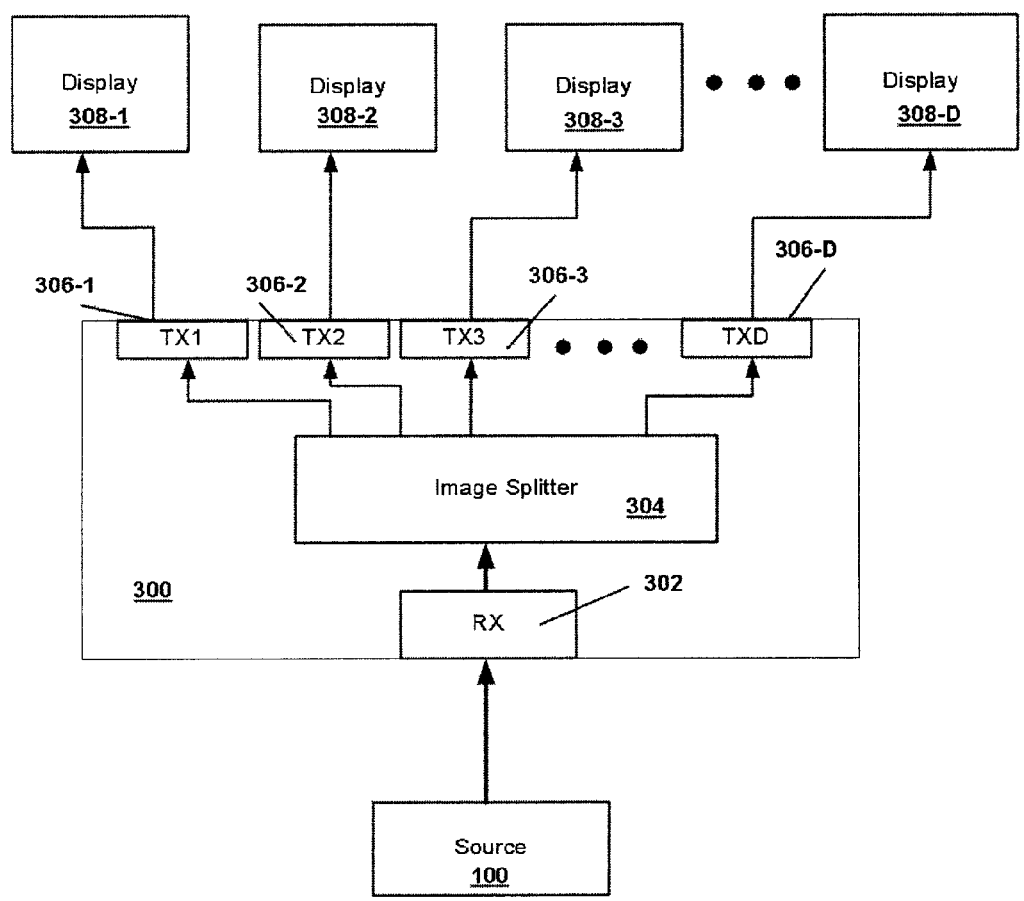
FIG. 3 illustrates a multi-monitor system consistent with the present invention.

FIG. 3 illustrates a multi-monitor system 300 consistent with embodiments of the present invention. As shown in FIG. 3, multi-monitor system 300 receives video data from source 100 into receiver (RX) 302. As such, consistently with the DisplayPort standard, RX 302 includes the main link data, the auxiliary channel data, and the HPD data as described above. RX 302 receives the data and provides that data to an image splitter 304. RX 302 also interacts with source 100 so that source 100 operates as if multi-monitor system 300 is a DisplayPort compatible sink with an N×M display device. As such, multi-monitor controller 300 interacts with source 100 in the same fashion as sink 120 shown in FIG. 1.

Figure 6A:
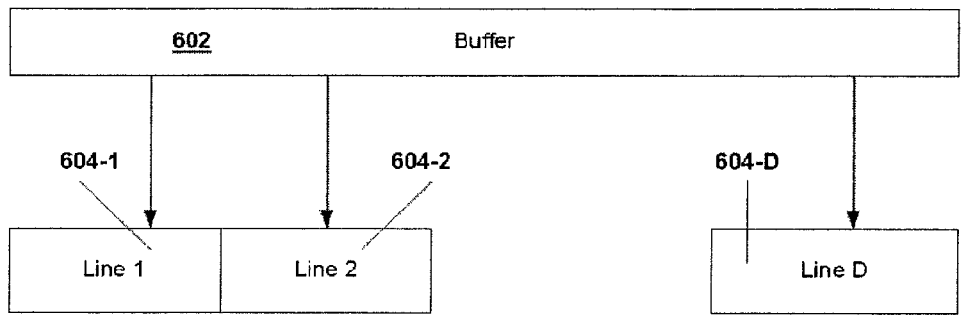
FIGS. 6A and 6B graphically illustrate an image splitter component of the multi-monitor system presented in FIGS. 5A and 5B.
Figure 6B:
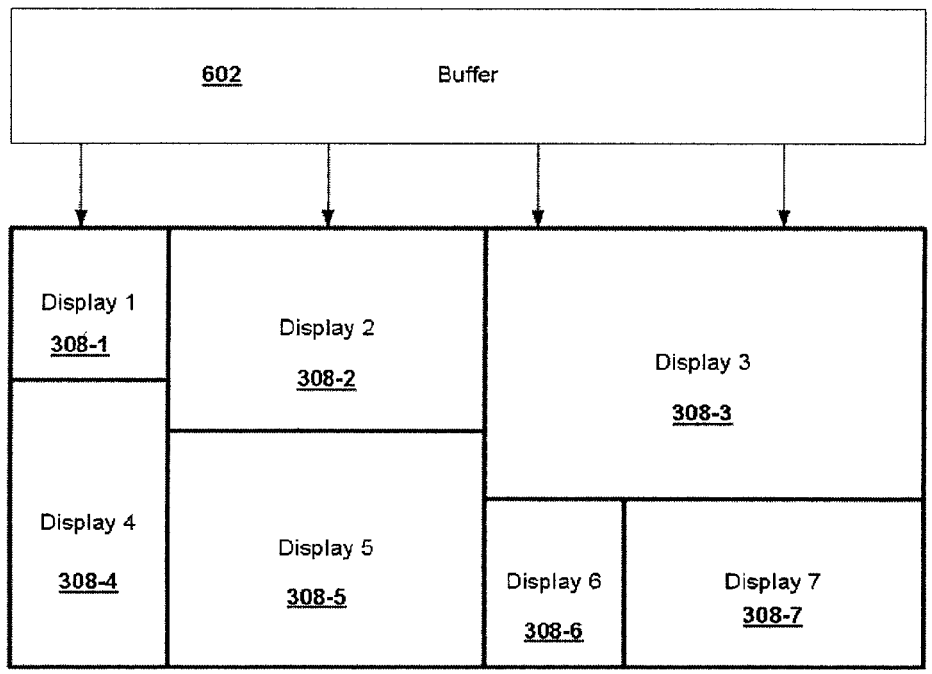

Image splitter 304 receives video data from receiver 302 and splits the video data into portions for display on a plurality D of multiple displays 308-1 through 308-D. In general, an image splitter consistent with the present invention can split an N×M sized video data into any number of separate displays that span the video data in that they either display substantially all or all of the video data on a plurality of displays. Although some embodiments may include a total of N pixels horizontally and M pixels vertically (i.e., M rows of N pixels), so that the received video data is completely displayed, in some embodiments the N×M sized video data may be padded or cropped accordingly to fit on a plurality of displays of differing size. FIG. 6A illustrates splitting of the horizontal line into multiples of lines for display onto separate displays. FIG. 6B illustrates both a horizontal and vertical splitting of the video frame for display onto multiple monitors horizontally and vertically. As particular examples, 3840×1200 video data can be displayed on two 1920×1200 displays; a 3720×1440 video can be displayed on two 900×1440 and one 1920×1440 displays; a 5040×1050 video can be displayed on three 1680×1440 displays; and a 5760×900 video can be displayed on three 1440×900 displays. In each case, RX 302 interacts with source 100 as if it where an N×M display device.

Image splitter 304 arranges the data for transmission to each of displays 308-1 through 308-D and provides the new display data to transmitters 306-1 through 306-D. Transmitters 306-1 through 306-D can be coupled to displays 308-1 through 308-D, respectively. Each of transmitters 306-1 through 306-D can function, for example, as DP source devices and therefore operate as DP source 100, with image splitter 304 operating in the same fashion as stream source 102. As such, the transmission of data between 306-1 through 306-D and display 308-1 through 308-D, respectively, may be any of one, two, or four-lane DP transmissions, independently of whether RX 302 is a one, two, or four lane device.

Figure 4A:
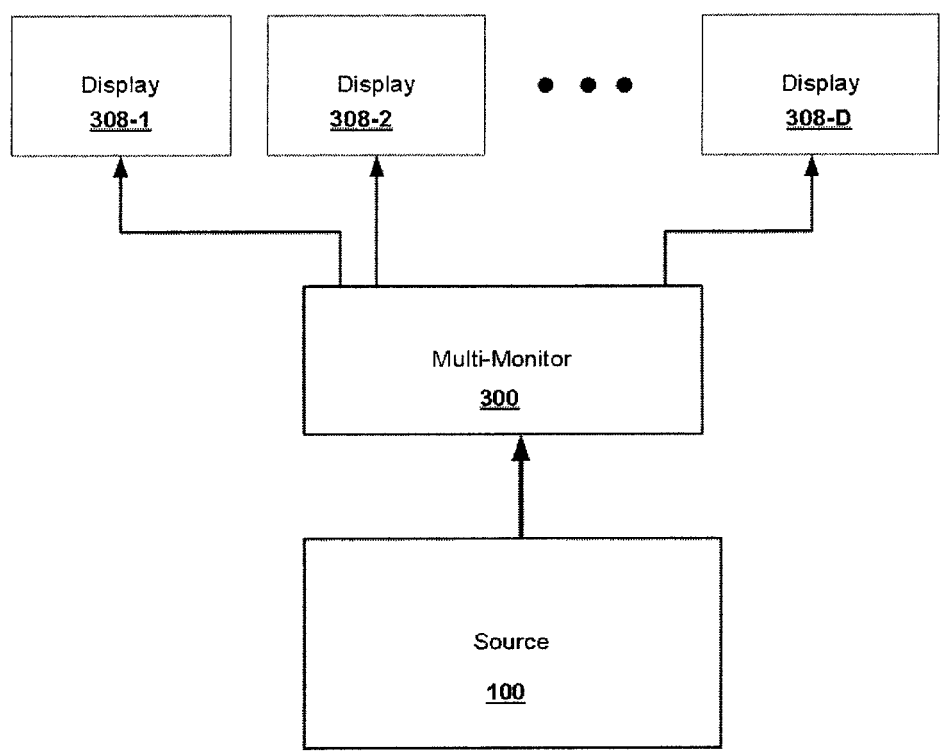
FIGS. 4A and 4B illustrate utilization of embodiments of the multi-monitor systems in different configurations.
Figure 4B:
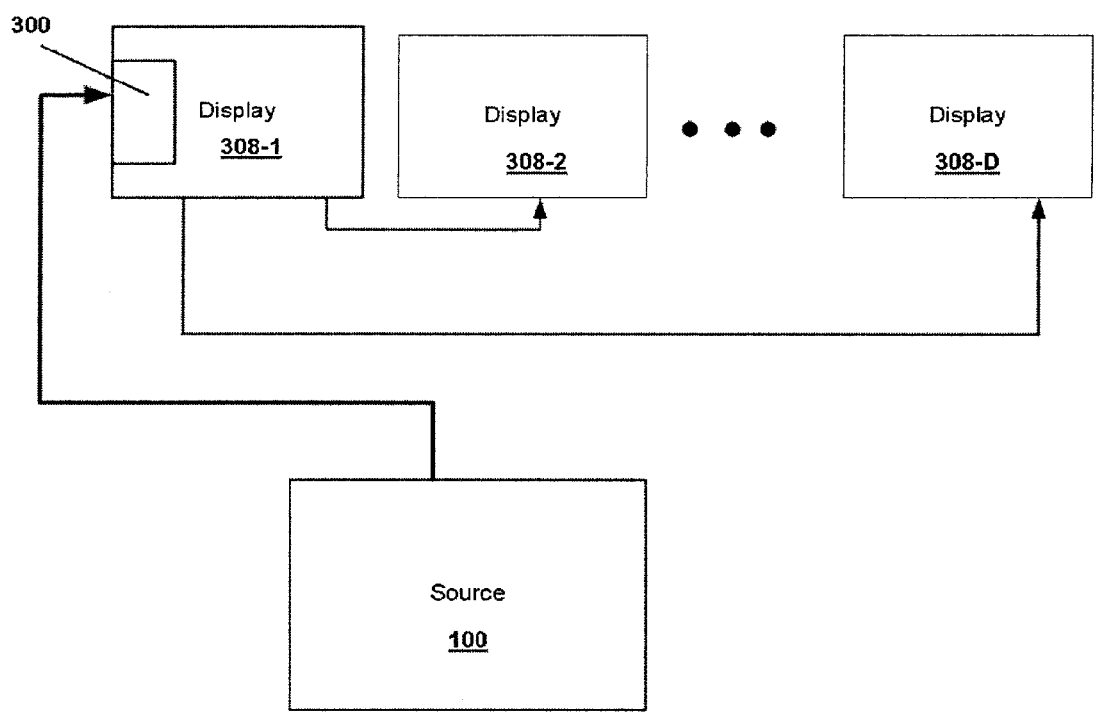

FIGS. 4A and 4B illustrate example configurations of multi-monitor controller 300. As shown in FIG. 4A, multi-monitor controller 300 can be a stand-alone box. Source 100 is coupled to multi-monitor controller 300. Each of displays 308-1 through 308-D can then also be coupled to multi-monitor controller 300. As shown in FIG. 4B, multi-monitor controller 300 can be built into one of the displays, display 308-1, for example. The remaining displays, display 308-2 through 308-D, can then be coupled to display 308-1. Source 100 is then coupled directly to display 308-1. As such, display 308-1 acts as a master display while displays 308-2 through 308-D act as slave displays.

Figure 5A:
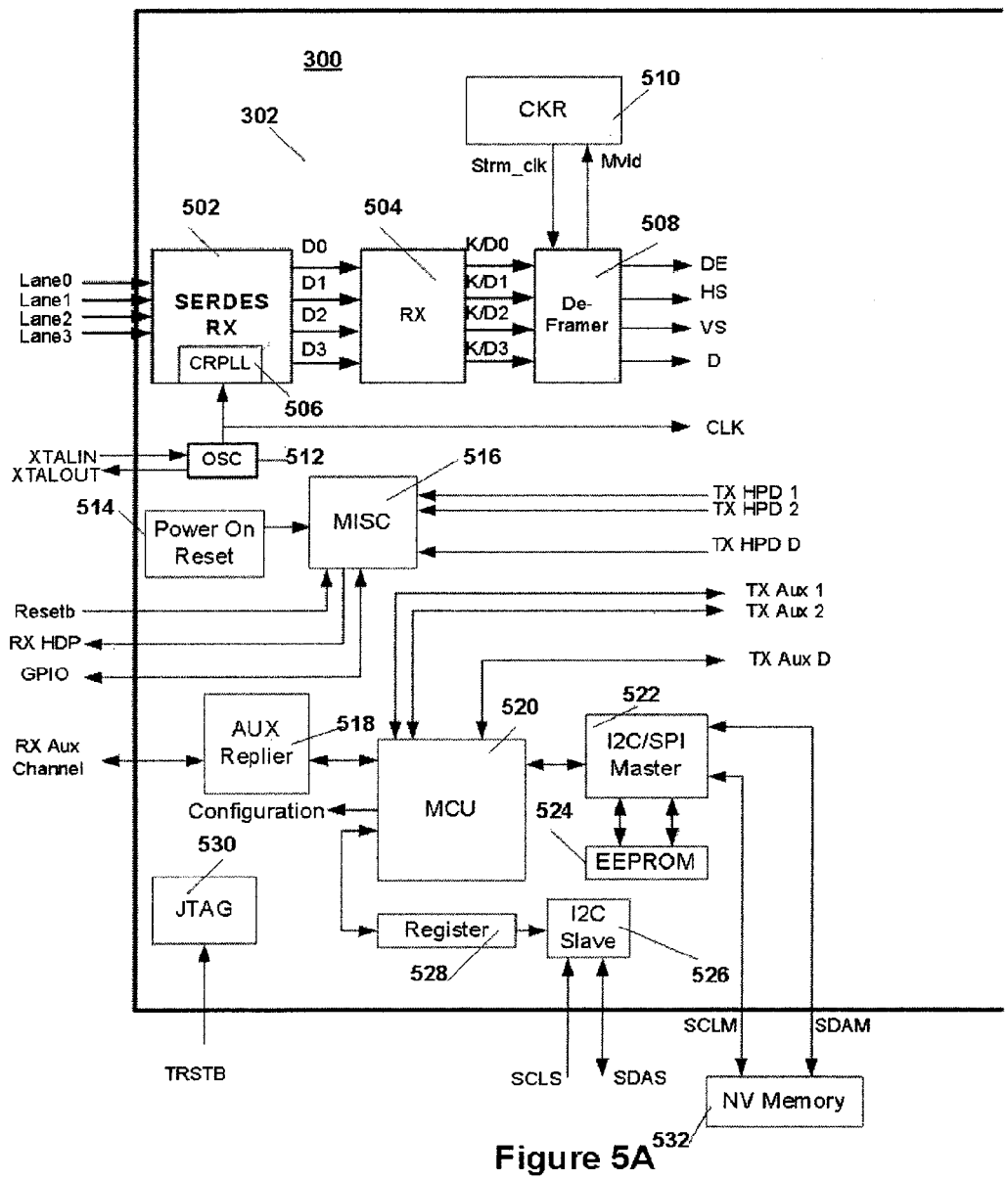
FIGS. 5A and 5B illustrate an embodiment of a multi-monitor system according to the present invention.
Figure 5B:
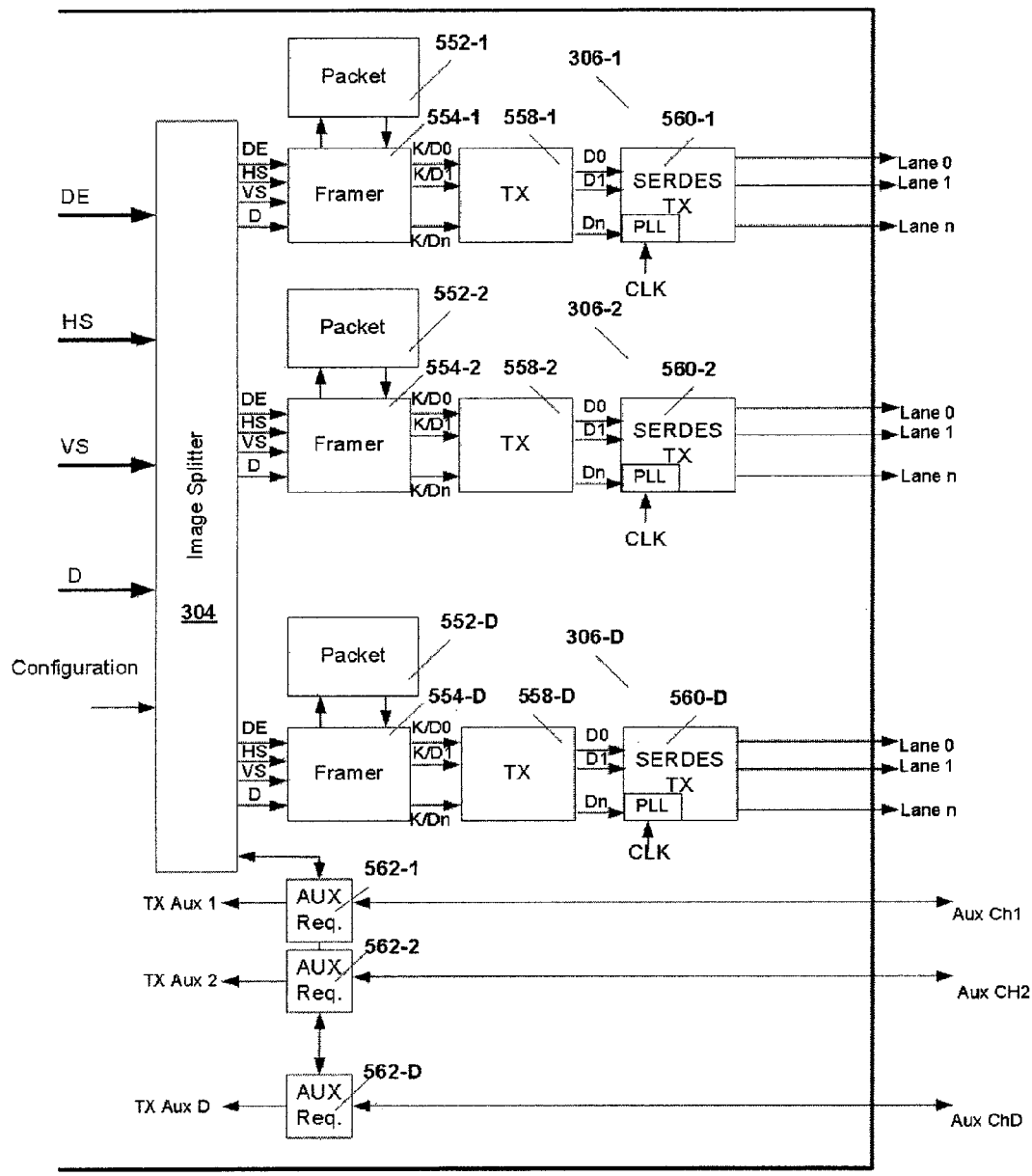

FIGS. 5A and 5B illustrate an example of multi-monitor system 300 in more detail. As shown in FIG. 5A, RX 302 includes SERDES RX 502, receiver 504, De-Framer 508, and video clock recovery CKR 510. Main link data are input into SERDES RX 502. Although FIG. 5A illustrates an example with four lanes, any number of lanes compatible with the DP standard may be utilized. SERDES RX 502 further includes CRPLL 506 that recovers link symbol clock that is embedded in main link data input to system 300. CRPLL 506 receives a clock signal from oscillator 512, which may receive an external reference signal XTALIN and may provide an external signal XTALOUT. SERDES RX 502 physically receives and filters the data, which may be transmitted as serial data, according to a clock generated by CRPLL 506, to produce parallel data streams D0, D1, D2, and D3. Receive block 504 performs filtering, anti-aliasing, de-skewing, HDCP decrypting and other functions.

Data D0, D1, D2, and D3 are then input to De-Framer 508. De-Framer 508 unpacks data from the four lanes and provides a data enable signal (DE), horizontal sync (HS), vertical sync (VS) and data stream D. Data stream D includes, sequentially, each of the pixel data for the frame. Audio data included in the four lanes may be handled separately from the video data. The horizontal sync signal indicates the end of each horizontal line of data while the vertical sync signal indicates the end of each video frame. The signals DE, HS, VS, and D are input to image splitter 304, as is shown in FIG. 5B.

Image splitter 304 provides new values DE, HS, VS, and D appropriate for each of displays 308-1 through 308-D to the corresponding one of transmitters 306-1 through 306-D. As shown in FIG. 6A, for example, data for each line of displays can be received into a buffer appropriately sized to hold the data for display on the displays. Therefore, the buffer may be smaller than the size of the line of data or may be large enough to hold several lines of data. Data for each individual display, then, can be read from the buffer. Data D received into splitter 304, for example, can be stored in buffer 602. A line of data, for example, can then be split from buffer 602 into lines 604-1 through 604-D, one for each of a set of horizontally distributed displays. FIG. 6B illustrates splitting of data, both horizontally and vertically, for display onto displays 308-1 through 308-7. In the seven-display example illustrated in FIG. 6B, displays 308-1 through 308-7, all having different pixel sizes, are arranged to span the entire range of data size, N×M pixels. Therefore, the sum of line pixels across displays 308-1, 308-2, and 308-3 is N, the sum of line pixels across displays 308-4, 308-5, 308-6, and 308-7 is N, the sum of rows in displays 308-1 and 308-4 is M, the sum of rows in displays 308-2 and 308-5 is M, the sum of rows in displays 308-3 and 308-6 or 308-7 is M. In some embodiments, if the D displays are not arranged to utilize all of the N×M pixels, excess pixels may be discarded, or cropped. Further, if the aggregate size of the displays exceeds the span of N×M pixels, additional black pixels may be added.

Figure 7:
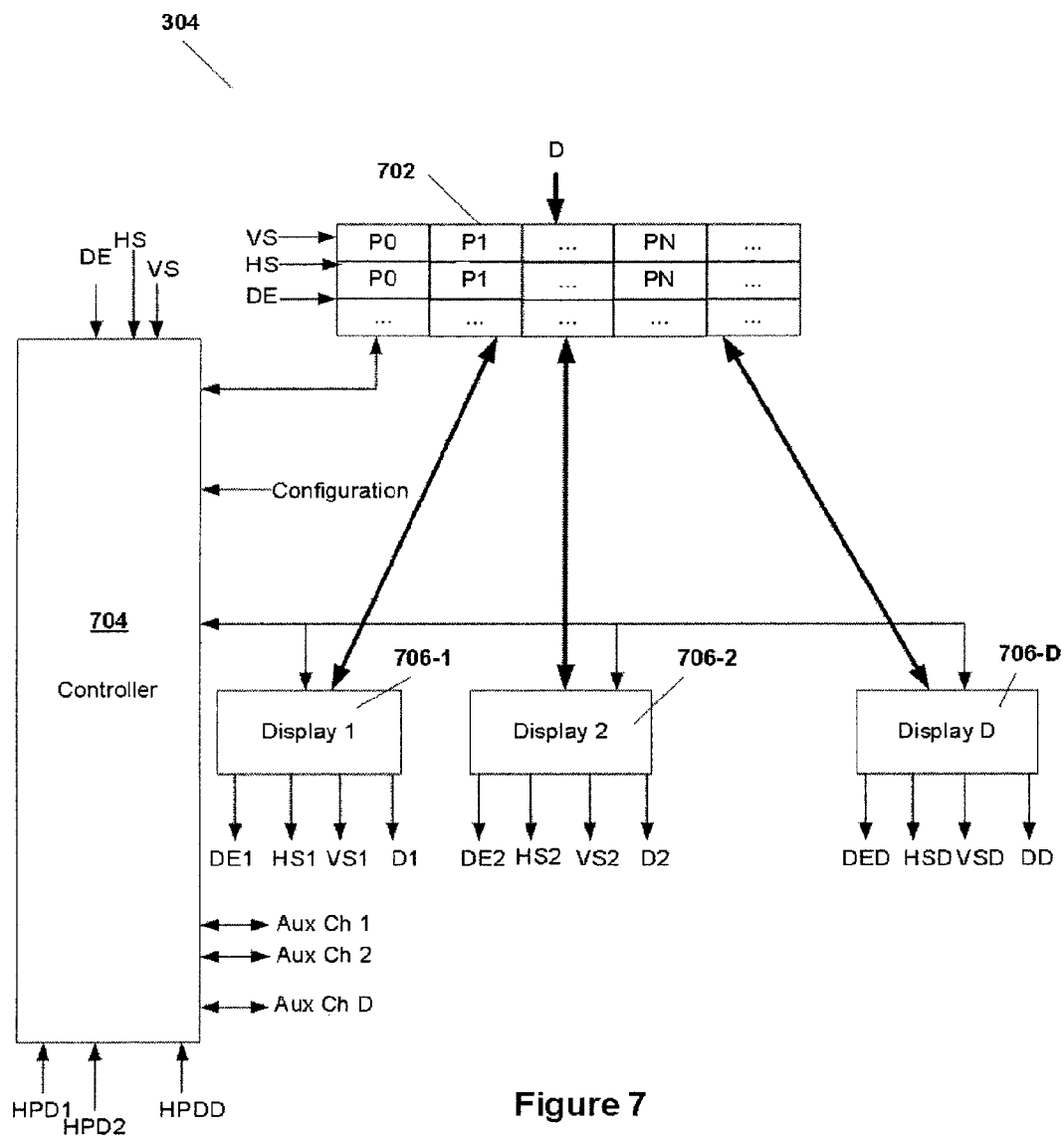
FIG. 7 illustrates a block diagram of an image splitter such as that shown in FIGS. 5A and 5B.

FIG. 7 shows an example block diagram of splitter 304 consistent with some embodiments of the present invention. Data D is received into buffer controller 702, which includes buffer 602, according to the control signals HS, VS, and DE. As shown in FIG. 7, data can be inserted line-by-line into the buffer, although the buffer included in buffer controller 702 may not need to be large enough to contain an entire frame of data. Buffer controller 702 can also include input from controller 704. Controller 704 is further coupled to display controllers 706-1 through 706-D. Display controllers 706-1 through 706-D read data from the buffer in buffer controller 702 appropriate for the corresponding one of displays 308-1 through 308-D.

Controller 704 further is coupled to communicate with each of displays 308-1 through 308-3 through auxiliary channels 1 through D, and through HPD 1 through HPD D. Further, configuration data can be supplied to controller 704 so that controller 704 receives pixel size N×M, and the pixel sizes of each of displays 308-1 through 308-D, the orientation of displays 308-1 through 308-D with respect to each other, and whether or not displays 308-1 through 308-D are active or whether a smaller set of displays will be utilized. In one particular example, D displays are arranged horizontally so that each line of data can be transferred directly to one of displays 706-1 through 706-D. In that case, buffer controller 702 may only include a line buffer. However, with vertical splitting, buffer controller 702 may include a frame buffer. Additionally, if one or more of monitors 308-1 through 308-D are rotated in the display (i.e., the normally n pixel lines by m rows is utilized in a m×n fashion), then a line buffer and a frame buffer may be utilized. Any such rotations may be digitally computed in the corresponding one of display controllers 706-1 through 706-D.

As such, display controllers 706-1 through 706-D read the data from buffer controller 702 that is appropriate for its corresponding display 308-1 through 308-D. Display controllers 706-1 through 706-D then outputs control signals DE, HS, and VS along with a data stream D that is appropriate for the corresponding one of displays 308-1 through 308-D.

As shown in FIG. 5B, data for each of displays 308-1 through 308-D is then transmitted in DP Transmitters 306-1 through 306-D, respectively. Data D along with control signals DE, HS, and VS for each of DP transmitters 306-1 through 306-D is received by Framer 554-1 through 554-D, respectively. Framer 554-1 through 554-D, which are in communication with packet controllers 552-1 through 552-D, respectively, collects the data into lanes as illustrated in FIGS. 2A and 2B. Although four lanes are shown in FIG. 5B, any number of lanes can be utilized in each of DP transmitters 306-1 through 306-D and each of DP transmitters 306-1 through 306-D are configured compatibly with the corresponding one of displays 308-1 through 308-D. Transmitters 558-1 through 558-D receive the lane data D0, D1, D2, to Dn from Framer 554-1 through 554-D, respectively, and provides pre-processing to the data streams. Data D0 through Dn from each of transmitters 558-1 through 558-D is then input to SERDEX TX 560-1 through 560-D, respectively, and transmitted serially across lanes 0 through n to a corresponding display 308-1 through 308-D.

Aux Req. 562-1 through 562-D communicate through the auxiliary channels of each of displays 308-1 through 308-D. Identification data (e.g., EDID data) for each of displays 308-1 through 308-D can then be communicated with image splitter 304. Further, auxiliary requests from any of displays 308-1 through 308-D can be communicated to MCU 520 for further processing.

MCU 520 controls the configuration and operation of multi-monitor 300. MCU 520 can communicate, for example, through an I2C controller, which may be coupled to EEPROM 524 and an external non-volatile memory 532. Further, MCU 520 may communicate through register 528 with an I2C slave device 526 for communication and setup. MCU 520 can respond to auxiliary requests from video source 100 through auxiliary replier 518. In which case, MCU 520 can provide EDID data to source 100 so that source 100 acts as if it is communicating with a video sink of size N by M, when in fact it is driving a plurality of video sinks that display some or all of the N by M pixels. Further, each of displays 308-1 through 308-D acts as if it is in communication with a source of size appropriate for that display, and not as a set of cooperating displays. Further, MCU 520 reads display identification data (EDID) via AUX-CH from each displays 308-1 through 308-D in order to build display identification data (EDID) that is read by video source 100.

MISC 516 is coupled to receive all of the HDP channels for each of displays 308-1 through 308-D and compiles an HDP signal for MCU 520 and generating RX HDP to source 100. A power reset 514 can generate a reset signal from power on and reset system 300. Further, a Joint Testing Action Group (JTAG) 530 may be utilized for testing purposes.

In addition to DisplayPort technologies, another technology that can benefit greatly from embodiments of the present invention are ePaper displays. Electronic paper is an attractive display technology because, unlike conventional displays, the pixels are not illuminated by a backlight as in LCD displays and the pixels do not generate light as in LED or plasma displays. Instead, as in conventional print on paper, ePaper reflects light and is capable of holding an image without drawing power, while still allowing the image to be changed. Applications for ePaper include signs, electronic books, electronic billboards, mobile phones, and other areas where low power applications are important. Color applications can also be important, for example for information boards, digital photo frames, and other applications.

There are several technologies available for achieving electronic paper. Gyricon technology consists of polyethylene spheres of size between 75 and 106 micrometers, each sphere having a black half having one charge and a white half having the other charge so that each sphere is a dipole. The spheres are placed in a bubble of oil so that it rotates freely and a voltage applied to determine which side of the sphere is facing up.

Electrophoretic displays are formed of titanium dioxide particles of approximately one micrometer diameter. The particles are suspended in a colored dye between two parallel conducting pixelated plates. The plate can be charged, attracting the titanium dioxide particle or repelling the titanium dioxide particle. Areas of the top plate that attract titanium dioxide will appear white because of the reflection from titanium dioxide. Areas of the top plate that repel titanium dioxide will appear black because of the absorption of light in the dye.

Other technologies include electrowetting, which utilizes a water/oil interface, and electrofluidic displays. In any case, the ePaper display is an array of pixels, each pixel of which can be controlled to display an image. Image data can be sent to the ePaper display in any fashion. The ePaper display receives the image data and controls the voltages at each pixel in the display in order to write the image.

Figure 8:
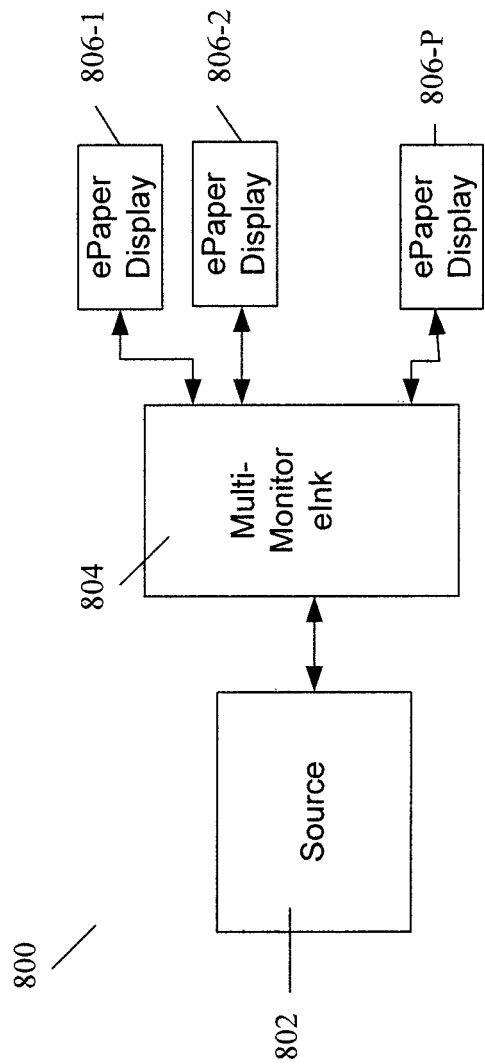
FIG. 8 illustrates a multi-monitor ePaper system according to some embodiments of the present invention.

FIG. 8 illustrates a multi-media system according to some embodiments of the present invention. As shown in FIG. 8, a source 802 transmits image data to multi-monitor receiver 804. Multi-monitor receiver 804 receives the image and splits the image into P separate images according to area and transmits the P separate images to displays 806-1 through 806-P for display. In the fashion, an N×M image sent to multi-monitor receiver 804 is split into P images according to pixel location in the N×M image, each of which is present in the appropriate formats to displays 806-1 through 806-P.

Figure 9:
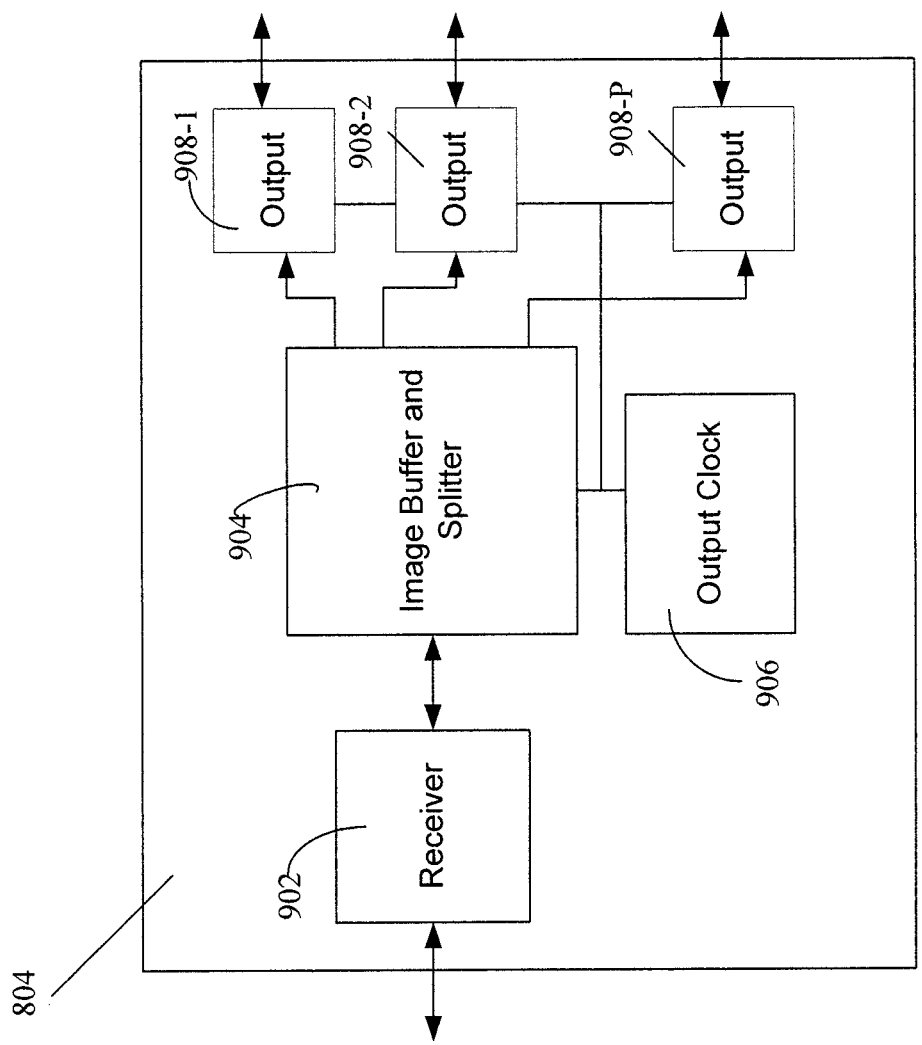
FIG. 9 illustrates further aspects of a multi-monitor ePaper system such as that shown in FIG. 8.

FIG. 9 illustrates an embodiment of multi-monitor receiver 804 according to some embodiments of the present invention. As shown in FIG. 9, image data is received in receiver 902. In some embodiments, receiver 902 may receive packets of data that include the image data and perform clock and data recovery functions in order to obtain the image data. The image data corresponding to the image is provided to image buffer 904. Image buffer 904 determines which area of the image is to be displayed on which of the displays. As a result, image buffer 904 then splits the image data between the P displays 806-1 through 806-P according to the appropriate area of the image, resulting in P display images. Image data corresponding to each of the P display images is then provided to output drivers 908-1 through 908-P. Further, output clock 906, which may include a phase-locked loop, provides a clock to image buffer 904 and output drivers 908-1 through 908-P.

Each of output drivers 908-1 through 908-P receives image data corresponding to the display image assigned to that driver. In each case, output drivers 908-1 through 908-P places the image data in the appropriate format for transmission to each of displays 806-1 through 806-P, respectively, and transmits the data to displays 806-1 through 806-P.

In that fashion, source 802 views the multi-monitor system as a single display with N×M pixels. Further, each of displays 806-1 through 806-N, each of which displaying a portion of the image provided by source 802, receives data corresponding to its portion in an appropriate format for display.

The examples provided above are exemplary only and are not intended to be limiting. One skilled in the art may readily devise other multi-monitor systems consistent with embodiments of the present invention which are intended to be within the scope of this disclosure. As such, the application is limited only by the following claims.

What is claimed is:

1. A multi-monitor system, comprising: an image receiver configured to receive image data of N pixels by M pixels from a number of input lanes, the image receiver comprising: a SERDES receiver configured to: receive the image data from the number of input lanes; and filter the image data based on the number of input lanes to obtain filtered image data, wherein the SERDES receiver comprises a CRPLL configured to recover a link symbol clock embedded in the image data; and a de-framer coupled to the SERDES receiver and a splitter and configured to: unpack the filtered image data to obtain unpacked image data; and provide to the splitter, based on the unpacked image data, a data enable signal, a horizontal sync signal, a vertical sync signal, and a data stream comprising the image data; a plurality of transmitters, each of the plurality of transmitters configured to provide a portion of the image data to a corresponding display of a plurality of displays using, at least in part, a buffer, wherein each display of the plurality of displays is associated with a different portion of the buffer; and the splitter coupled between the image receiver and the plurality of transmitters, the splitter comprising: a controller coupled to the plurality of displays, the controller configured to: receive configuration data for each of the displays using a plurality of auxiliary channels, the configuration data including a pixel size, orientation, and an indication of whether the display is active; divide the image data into the portions based on the received configuration data; generate a plurality of new a data enable signals, a plurality of new horizontal sync signals, a plurality of new vertical sync signals, and a plurality of new data streams, wherein: each portion of the plurality of portions is associated with one of the plurality of new a data enable signals, one of the plurality of new horizontal sync signals, and one of the plurality of new vertical sync signals, and each new data stream of the plurality of new data streams comprises one of the plurality of portions of the image data; and providing, to each transmitter of a plurality transmitters, one new data enable signal of the plurality of data enable signals, one new horizontal sync signal of the plurality of horizontal sync signals, one new vertical sync signal of the plurality of vertical sync signals, and one new data stream of the plurality of new data streams.

2. The multi-monitor system of claim 1, wherein the image receiver is an electronic paper compatible receiver.

3. The multi-monitor system of claim 1, wherein the image receiver is a DisplayPort compatible receiver.

4. The multi-monitor system of claim 1, wherein at least one of the plurality of transmitters is an electronic paper compatible transmitter.

5. The multi-monitor system of claim 1, wherein at least one of the plurality of transmitters is a Display Port compatible transmitter.

6. The multi-monitor system of claim 1, wherein the portions are arranged horizontally.

7. The multi-monitor system of claim 6, wherein the portions of image data provided to the plurality of transmitters has M pixels, and the sum of the pixels across the plurality of portions is N pixels.

8. The multi-monitor system of claim 1, wherein the portions are arranged vertically.

9. The multi-monitor system of claim 8, wherein the portions of image data provided to the plurality of transmitters has N pixels and the pixels sum to M pixels.

10. The multi-monitor system of claim 1, wherein the portions are arranged both vertically and horizontally.

11. The multi-monitor system of claim 10, wherein the portions of image data provided to the plurality of transmitters sums to N pixels horizontally and M pixels vertically.

12. The multi-monitor system of claim 1, wherein the image data comprises video data.

13. A method of providing a multi-monitor display, comprising: receiving, at an image receiver and from a number of input lanes, image data of size N pixels by M pixels, the image receiver comprising a SERDES receiver and a de-framer, wherein the de-framer is coupled to the SERDES receiver and a splitter, and wherein the SERDES receiver comprises a CRPLL; receiving, at the SERDES receiver, the image data from the number of input lanes; filtering, by the SERDES receiver, the image data based on the number of input lanes to obtain filtered image data; recovering, by the CRPLL, a link signal clock embedded in the image data; unpacking, by the de-framer, the filtered image data to obtain unpacked image data; providing, to the splitter and based on the unpacked image data, a data enable signal, a horizontal sync signal, a vertical sync signal, and a data stream comprising the image data; splitting, by the splitter, the image data into a plurality of portions; generating, by the splitter, a plurality of new data enable signals, a plurality of new horizontal sync signals, a plurality of new vertical sync signals, and a plurality of new data streams, wherein: each portion of the plurality of portions is associated with one of the plurality of new a data enable signals, one of the plurality of new horizontal sync signals, and one of the plurality of new vertical sync signals, and each new data stream of the plurality of new data streams comprises one of the plurality of portions of the image data; providing to each transmitter of a plurality transmitters, by the splitter, one new data enable signal of the plurality of data enable signals, one new horizontal sync signal of the plurality of horizontal sync signals, one new vertical sync signal of the plurality of vertical sync signals, and one new data stream of the plurality of new data streams; and transmitting, by the plurality of transmitters, the plurality of portions to a plurality of displays using, at least in part, a buffer, wherein each display of the plurality of displays is associated with a different portion of the buffer, wherein the splitting is based, at least in part, on a pixel size, orientation, and indication of whether a display is active for each of the plurality of displays.

14. The method of claim 13, wherein receiving image data further includes receiving data for an electronic paper display.

15. The method of claim 13, wherein receiving image data further includes receiving data according to the Display Port standard.

16. The method of claim 13, wherein the plurality of displays are arranged horizontally and splitting the image data into a plurality of portions includes separating the N pixels by M pixels into a group of pixels for each of the plurality of displays.

17. The method of claim 16, wherein a sum of pixels of the groups of pixels is N pixels.

18. The method of claim 13, wherein the plurality of displays are arranged vertically and splitting the image data into a plurality of portions includes separating the M pixels by N pixels into a group of pixels for each of the plurality of displays.

19. The method of claim 18, wherein a sum of pixels of the groups of pixels is M pixels.

20. The method of claim 13, wherein the plurality of displays are arranged in an array horizontally and vertically and splitting the image data into a plurality of portions includes separating the N pixels into pixel groups horizontally and separating the M pixels into pixel groups vertically so that an appropriate portion of the image data is displayed on a corresponding one of the plurality of displays.

21. A multi-media display system, comprising: a source; a plurality of electronic paper compatible displays; and a DisplayPort-compatible multi-monitor receiver coupled between the source and the plurality of electronic paper compatible displays, the multi-monitor receiver comprising: a SERDES receiver, the SERDES receiver configured to: receive image data from a number of input lanes; and filter the image data based on the number of input lanes to obtain filtered image data, wherein the SERDES receiver comprises a CRPLL configured to recover a link symbol clock embedded in the image data; and a de-framer coupled to the SERDES receiver, and to an image buffer and splitter, and configured to: unpack the filtered image data to obtain unpacked image data; and provide to the image buffer and splitter, based on the unpacked image data, a data enable signal, a horizontal sync signal, a vertical sync signal, and a data stream comprising the image data; a master control unit (MCU) configured to receive configuration data from each of the electronic paper compatible displays on an auxiliary channel; the image buffer and the splitter coupled to the receiver and configured to: receive the data enable signal, the horizontal sync signal, the vertical sync signal, and the data stream; receive the configuration data from the MCU; split the image data into a plurality of portions based on pixel sizes and orientations of the electronic paper compatible displays included in the received configuration data; generate a plurality of new a data enable signals, a plurality of new horizontal sync signals, a plurality of new vertical sync signals, and a plurality of new data streams, wherein: each portion of a plurality of portions of the image data is associated with one of the plurality of new a data enable signals, one of the plurality of new horizontal sync signals, and one of the plurality of new vertical sync signals, and each new data stream of the plurality of new data streams comprises one of the plurality of portions of the image data; and provide to each output driver of a plurality output drivers one new data enable signal of the plurality of data enable signals, one new horizontal sync signal of the plurality of horizontal sync signals, one new vertical sync signal of the plurality of vertical sync signals, and one new data stream of the plurality of new data streams; the plurality of output drivers coupled between the image buffer and splitter and the plurality of electronic paper compatible displays, each of the plurality of output drivers configured to provide one portion of the plurality of portions of the image data to a corresponding electronic paper display.

* * * * *

UNITED STATES PATENT AND TRADEMARK OFFICE
CERTIFICATE OF CORRECTION

PATENT NO. : 9,684,482 B2  
APPLICATION NO. : 12/634571  
DATED : June 20, 2017  
INVENTOR(S) : Henry Zeng et al.

Page 1 of 1

It is certified that error appears in the above-identified patent and that said Letters Patent is hereby corrected as shown below:

In the Claims

• Claim 1, Column 10, Line 25, the letter "a", between the words new and data, should be removed.

• Claim 21, Column 12, Line 40, the letter "a", between the words new and data, should be removed.

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*